US005893394A

United States Patent [19]

Meloche

[11] Patent Number: 5,893,394

[45] Date of Patent: Apr. 13, 1999

[54] PNEUMATIC VALVE AND METHOD

[75] Inventor: Joseph L. Meloche, Bryan, Ohio

[73] Assignee: Ingersoll-Rand Company, Woodcliff Lake, N.J.

[21] Appl. No.: 08/884,797

[22] Filed: Jun. 30, 1997

[51] Int. Cl.[6] .......................... F15B 13/043; F16K 27/00

[52] U.S. Cl. .................... 137/884; 137/625.64; 277/598; 277/630

[58] Field of Search .............................. 137/625.64, 884; 277/598, 630

[56] References Cited

U.S. PATENT DOCUMENTS

| | | | |
|---|---|---|---|
| 3,602,246 | 8/1971 | Lang et al. | 137/270 |
| 3,631,881 | 1/1972 | Bowditch | 137/271 |
| 3,814,126 | 6/1974 | Klee . | |
| 4,014,364 | 3/1977 | Matrot | 137/271 |
| 4,587,991 | 5/1986 | Chorkey | 137/884 X |
| 5,048,569 | 9/1991 | Stoll et al. | 137/625.64 |
| 5,275,420 | 1/1994 | Rodenkirch | 277/1 |
| 5,567,868 | 10/1996 | Craig | 73/23.42 |

*Primary Examiner*—Gerald A. Michalsky

*Attorney, Agent, or Firm*—Michael M. Gnibus; Leon Nigohosian, Jr.

[57] ABSTRACT

A pneumatic control valve including a valve housing having at least two housing surfaces, and a unitary wrap gasket having at least two sealing portions, the wrap gasket is adapted to be wrapped substantially around the housing so that each of the at least two sealing portions is located on the respective housing surface.

9 Claims, 4 Drawing Sheets

PNEUMATIC VALVE AND METHOD

BACKGROUND OF THE INVENTION

The invention relates to a pneumatic control valve and method for assembling the same, and more particularly to a pneumatic control valve and method where the pneumatic control valve includes a valve housing with at least two housing faces and a unitary wrap gasket member having at least two sealing portions, wherein the wrap gasket is adapted to be wrapped around the housing in order to locate each of the sealing portions on the respective housing faces.

Known pneumatic control valves apply a pressurized fluid to a main control member, such as a spool, to reposition the control member and thus change the flow direction of the fluid flowing through the control valve to an object of interest such as a pump or tool for example. During operation of the object of interest, the control member is repositioned as required by flowing the fluid to the respective ends of the control member.

Fluid flow to the control member ends is controlled by solenoid valves flow connected to the valve housing ends. The fluid is flowed between the ends of the valve housing toward the solenoids at the housing ends and the solenoids are opened and closed as required to allow the fluid to flow to the member.

In order to form the required seals, discrete gasket members are sandwiched between the solenoids and housing. There are a number of shortcomings associated with use of a number of discrete gasket members in pneumatic valves. Use of conventional discrete gasket members adds additional time to the assembly of pneumatic control valve devices. The additional steps associated with properly orienting and assembling the discrete gaskets and housing increases the time and cost to assemble conventional pneumatic control valves.

Additionally, it is difficult to place known conventional discrete valves in the proper orientation on the valve housing so that the gasket openings overlay the corresponding valve housing openings. If the gasket is not properly oriented and in proper alignment with the housing openings, the valve will not operate efficiently and effectively. Frequently, such gasket misalignment is only discovered during post assembly testing of the device. The control device is disassembled and the misaligned gasket is properly aligned. The device is then reassembled.

The foregoing illustrates limitations known to exist in present control valves and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a pneumatic control valve comprising a housing having at least two housing surfaces; and a unitary gasket member having at least two sealing portions, the unitary gasket member is adapted to be wrapped around the housing to locate each of the at least two sealing portions on one of the at least two housing surfaces.

The foregoing and other aspects will become apparent from the following detailed description of the invention when considered in conjunction with the accompanying drawing figures.

DESCRIPTION OF THE DRAWING FIGURES

DESCRIPTION OF THE PREFERRED EMBODIMENT

Figure 1:
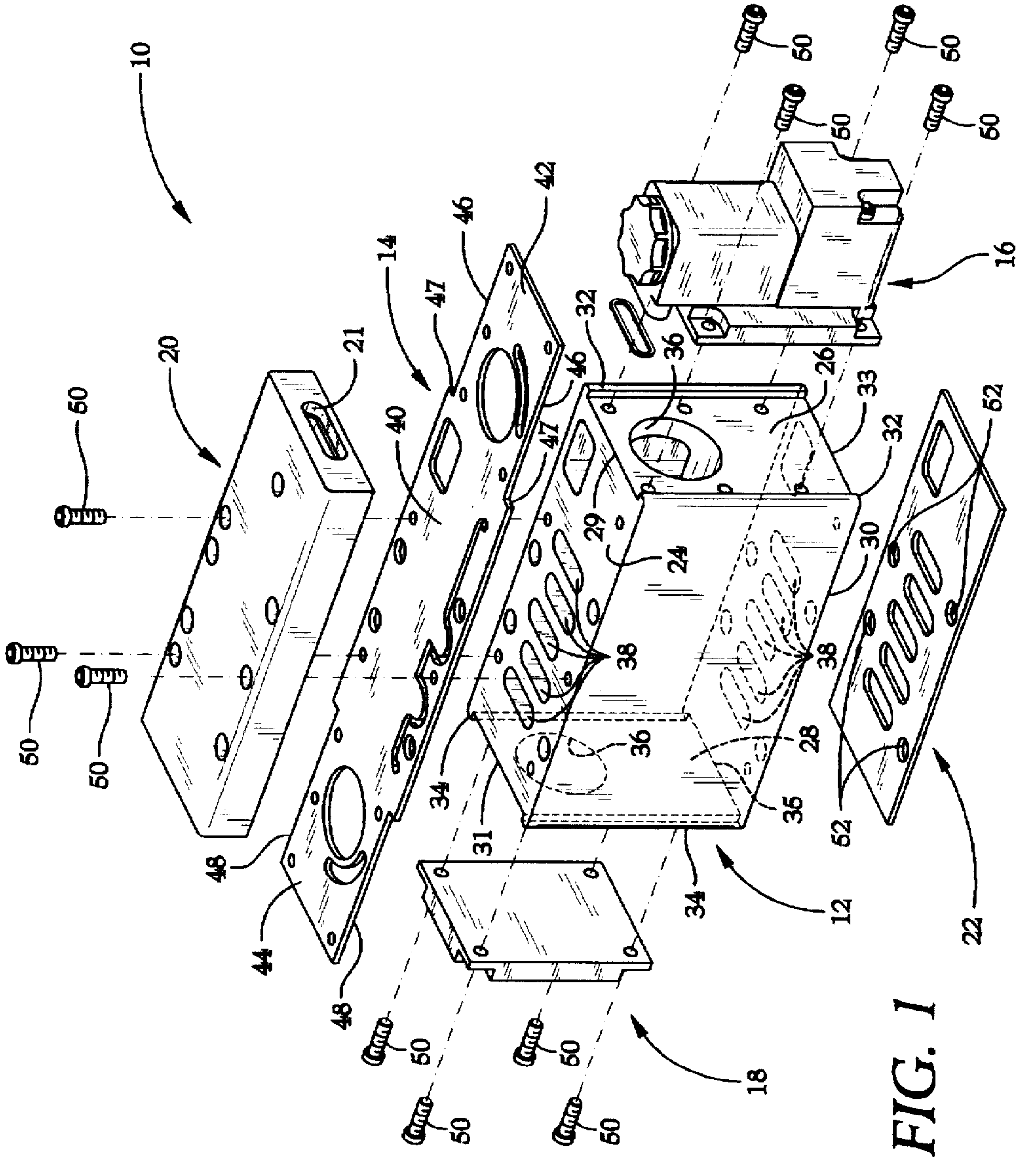
FIG. 1 is an exploded isometric view of the pneumatic control valve of the present invention.
Figure 2:
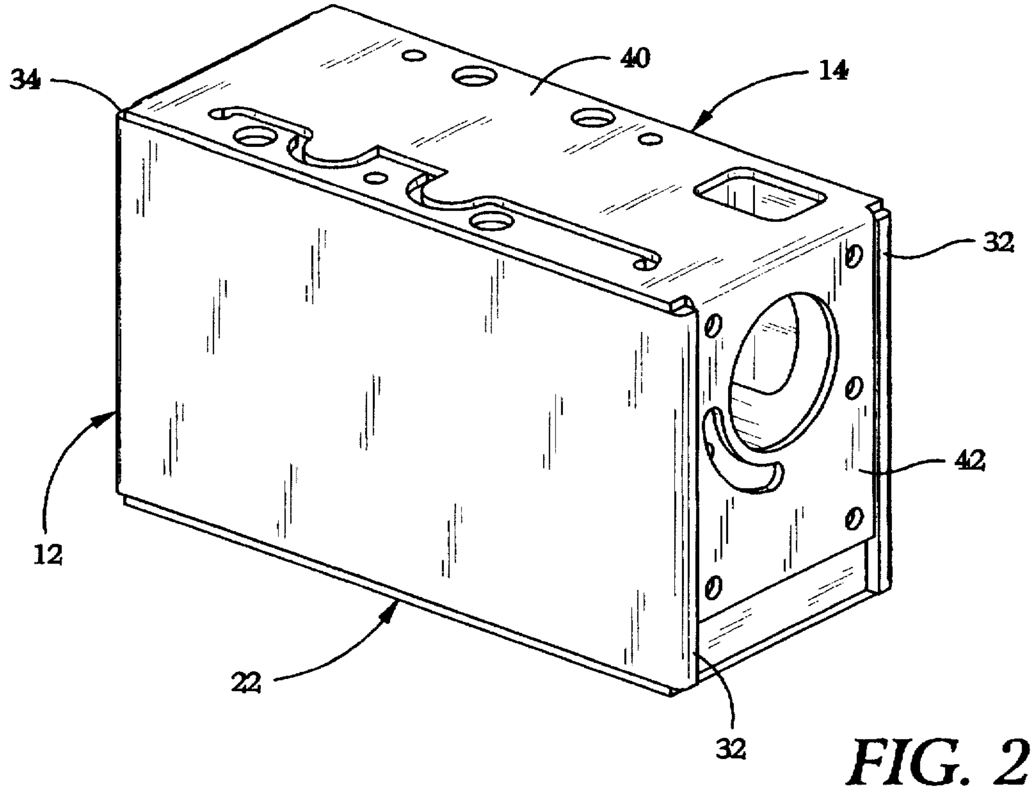
FIG. 2 is an isometric view of the housing and unitary wrap gasket of FIG. 1 showing the gasket wrapped around the housing.
Figure 3:
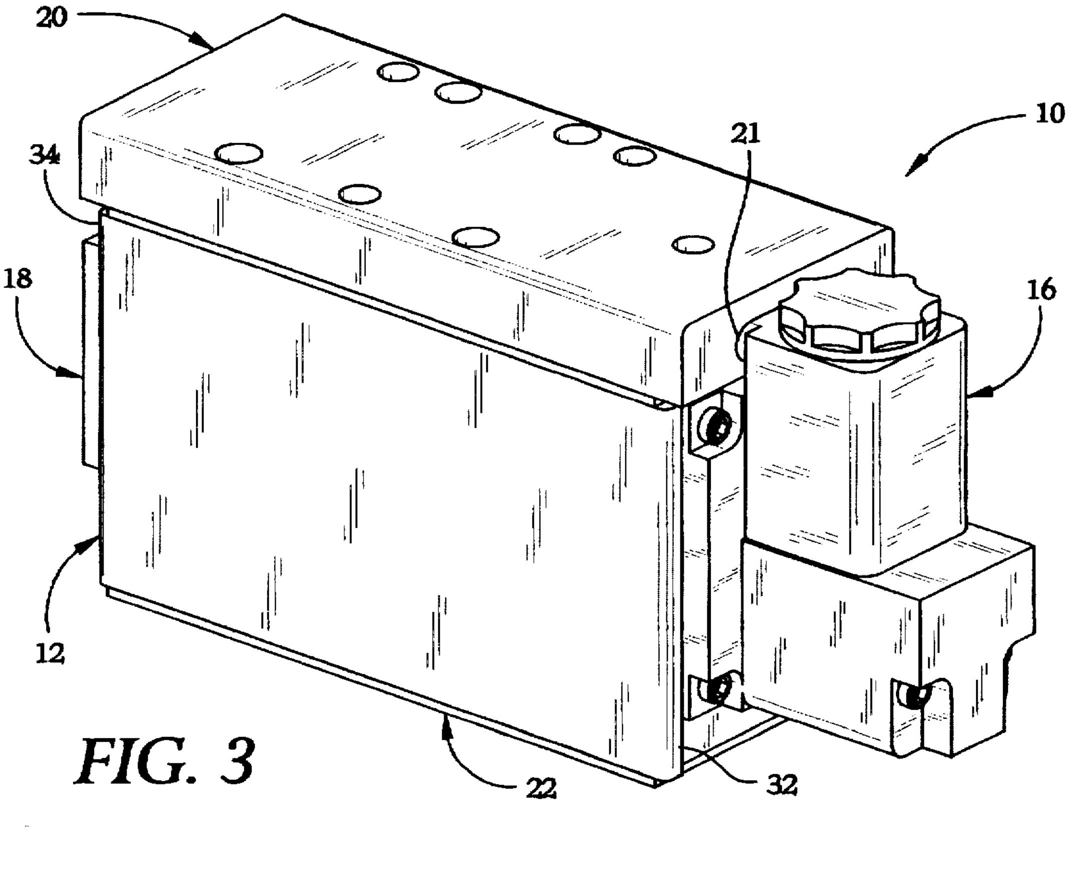
FIG. 3 is an isometric view of the assembled pneumatic control valve of FIG. 1.

Turning now to the drawings wherein like parts are referred to by the same number throughout the several views, and particularly to FIGS. 1–3 which illustrate a first embodiment pneumatic control valve 10, the pneumatic control valve is adapted to be flow connected to an object of interest, such as an air actuated tool or pump for example, to control the flow of fluid, such as air to the object of interest. Generally, the pneumatic control valve 10 includes a valve housing 12, unitary sealing member or wrap gasket 14, fluid flow control means 16, end plate 18, and cover plate 20. When the valve 10 is mounted for use on the housing of an object of interest, discrete gasket 22 is sandwiched between the housing 12 and the manifold housing of the object of interest (not shown).

The valve housing 12 includes four housing sealing surfaces 24, 26, 28, and 30 and each housing surface defines a respective plane. For purposes of describing the preferred embodiment of the invention, the housing is rectangular, however, it is contemplated that the housing could be any configuration with any number of housing sealing surfaces. As the description proceeds, surfaces 24–30 may be referred to as "housing surfaces" or "housing sealing surfaces" or "surfaces".

As shown in FIG. 1, laterally extending housing surfaces 26 and 28 are located at the housing ends and define parallel lateral planes. Longitudinally extending housing surfaces 24 and 30 define parallel longitudinal planes. The longitudinally extending surfaces 24 and 30 are perpendicular to and join lateral housing surfaces 26 and 28 respectively at edges 29 and 31 and edges 33 and 35. The housing 12 is adapted to receive a conventional spool member (not shown) that is well known to one skilled in the pertinent art. Conventional porting is provided along the housing surfaces 24, 26, 28, and 30 to produce the required fluid flow through the housing. Porting on surfaces 26 and 28 which permits fluid to be flowed to the spool ends is identified generally at 36 and porting on surfaces 24 and 30 which allows fluid to be flowed through the housing is identified generally at 38. The internal structure of the housing does not form part of the present invention and as a result does not need to be described in detail.

A pair of gasket alignment members 30 and 32 are made integral with the housing surfaces 26 and 28 and extend laterally between housing sealing surfaces 24 and 30 as shown in FIG. 1.

The unwrapped elongate unitary wrap gasket or sealing member 14, shown in FIG. 1, has a substantially rectangular perimeter. The unitary wrap gasket is flexible and is adapted to be wrapped around the housing in the manner shown in FIG. 2 when it is assembled with the housing 12.

The unitary gasket includes first sealing portion 40 that joins second and third sealing portions 42 and 44. When the unitary gasket is wrapped around the housing, the first sealing portion 40 is located on housing surface 24; the second sealing portion 42 is located on the housing surface 26 between alignment members 32; and the third sealing portion 44 is located on the housing surface 28 between alignment members 34. The sealing portions include porting that overlays the porting 36 or 38 on the respective housing surface when the gasket is assembled with the housing 12.

Since the three housing surfaces all define respective planes, and the gasket member has three sealing portions adapted to be located on the three housing surfaces when the two members are assembled, the single unitary gasket 14 provides sealing on multiple surfaces that do not lie in the same plane. In conventional pneumatic control valves, a discrete gasket member is required to provide a sealing on each housing surface.

Second and third sealing portions 42 and 44 include alignment member cutouts 46 and 48 respectively that receive the alignment members 32 and 34 when the sealing portions are located on the respective housing surfaces. In this way, the gasket is accurately located on the surfaces 26 and 28 ensuring proper positioning of the gasket on the housing in proper alignment with porting 36 and 38, and thereby preventing the gasket from covering all or a portion of the porting 36 and 38. By ensuring proper positioning of the gasket on the housing, disassembly of the pneumatic control valve 10 due to gasket misalignment is not required.

Fluid flow control means 16 is adapted to be located on the second gasket sealing portion 42 and thereby form the required seal between the control means and housing surface 26. For purposes of describing the first preferred embodiment of the invention, the control means 16 is a conventional solenoid valve well known in the pertinent art. The flow control means is connected to the housing by conventional fasteners 50. Although one control means 16 is shown in FIG. 1, a second control means like means 16 may be located on the sealing portion 44 and flow connected to the housing to form the required seal with surface 28.

The end plate 18 is adapted to be located on the gasket sealing portion 44 to thereby sandwich the sealing portion 44 between the end plate and the housing surface 28. Both the end plate and control means 16 are located on their respective gasket sealing portions between each pair of alignment members. The end plate is connected to the housing 12 by conventional fasteners 50.

The cover plate 20 is located on the first sealing portion 40 to thereby sandwich the sealing portion 40 between the cover plate 20 and the housing surface 24. Like end plates 16 and 18, conventional fasteners 50 connect the cover plate and housing and clamp the cover plate onto the sealing member portion 42. The fluid flow control member 16 is flow connected with the cover plate at cover plate opening 21. See FIG. 3.

Assembly of the pneumatic control valve 10 will now be described. The housing 12 may be mounted on the inlet manifold of an object of interest initially or after the valve has been assembled. In any event, the discrete gasket 22 is sandwiched between the bottom longitudinal housing surface 30 and the inlet manifold (not shown) to provide the required seal therebetween. Conventional fasteners like fasteners 50 are inserted through openings 52 formed in the gasket 22 to secure the housing to the manifold.

Gasket 14 is then wrapped around the housing 12. Generally, the gasket is aligned with one housing surface and is then wrapped around the housing and located on the two other housing surfaces.

When the gasket is initially aligned with housing surface 26, the sealing portion 42 is first located on surface 26 and alignment members 32 are slid into alignment cutout openings 46. The alignment members are slid through the cutouts 46 until the closed ends of the recesses 47 come in contact with the alignment members 32. When the alignment members are in contact with the closed ends of the alignment cutouts, the sealing portion 42 is properly positioned on surface 26 and is properly aligned with porting 36.

The first and third sealing portions 40 and 44 are wrapped around housing edge 29 and sealing portion 40 is located on housing surface 24. Finally, the third sealing portion 44 is wrapped around the housing edge 31 and is located on surface 28 with alignment guides 34 located in cut outs 48 in the manner previously described with sealing portion 42 and surface 26.

Alternatively, the gasket may be wrapped around the housing by initially locating the sealing portion 44 on housing surface 28 in the same way sealing portion 42 is located on surface 26 as described hereinabove. Then, the other portions 40 and 42 are located on their respective sealing portions by wrapping the gasket around housing edges 31 and 29.

Finally, the sealing portion 40 may first be located on surface 24. The remaining portions 42 and 44 are located on surfaces 26 and 28 by wrapping the portions around edges 29 and 31. The closed ends of the alignment cutouts are in contact with the alignment members after the portions 42 and 44 are wrapped around the housing edges.

When the gasket is wrapped around the housing in any of the foregoing methods, the sealing portions are located in the proper position on the respective housing surfaces. Orientation of the wrap gasket 14 is only required once. Discrete gaskets must be oriented each time a gasket is located on a housing surface.

After the gasket is wrapped around the housing using one of the three foregoing methods, the cover plate 20, fluid flow control means 16 and end plate 18 are connected to the housing. FIG. 3 illustrates the assembled pneumatic control valve 10. The end plate and flow control means are located between the alignment members 32 and 34 and are then connected to the housing. After the control means is flow connected to the cover plate, the cover plate is connected to the housing by fasteners 50.

Figure 4:
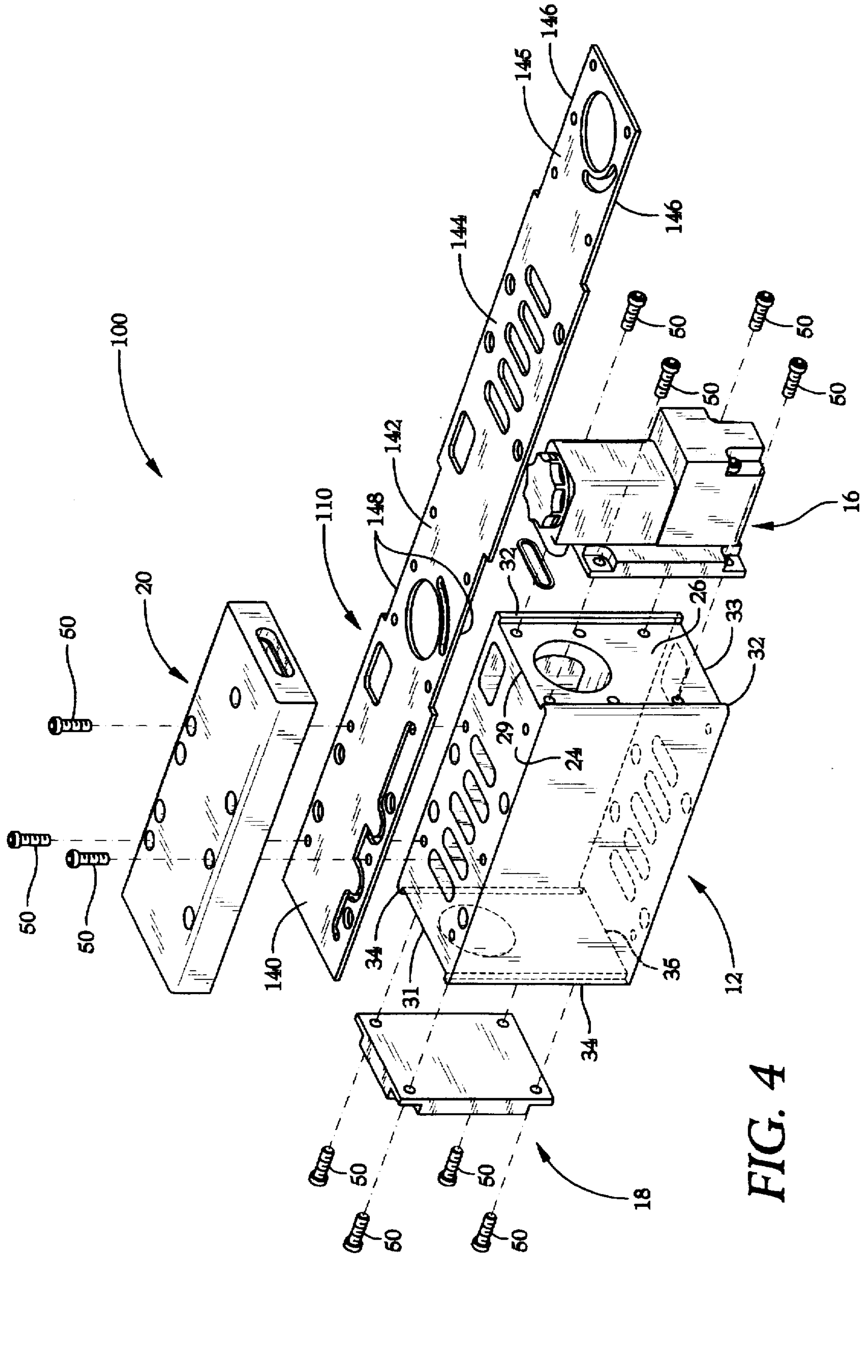
FIG. 4 is an exploded isometric view of an alternate embodiment pneumatic control valve.
Figure 5:
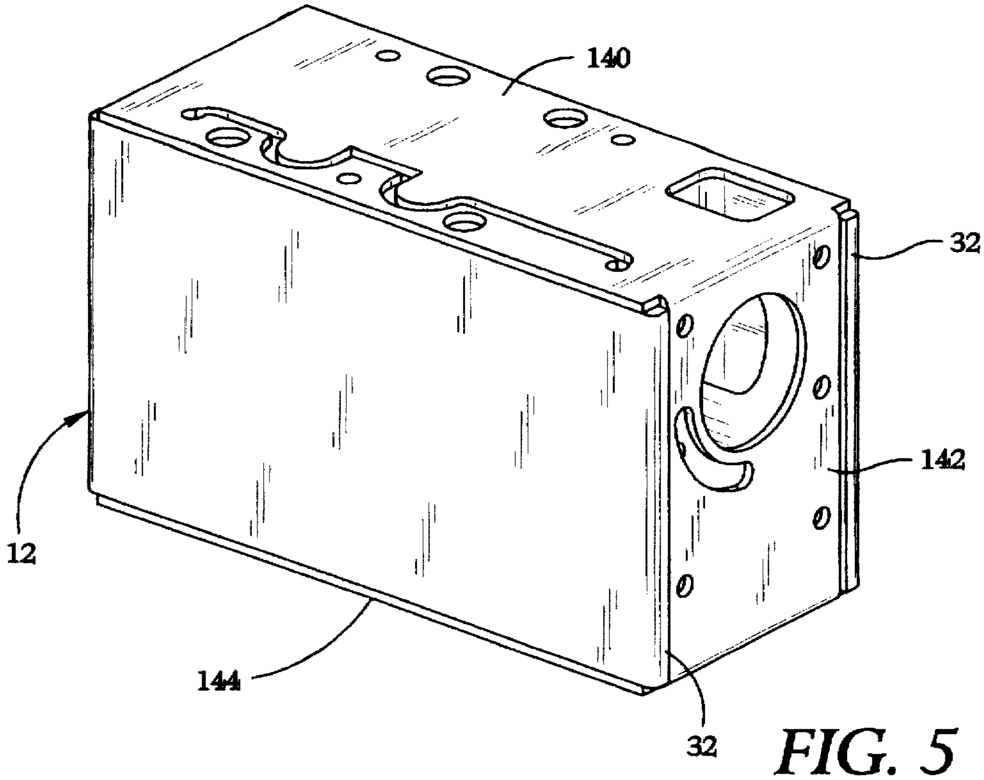
FIG. 5 is an isometric view of the housing and gasket of FIG. 4 showing the gasket wrapped around the housing.
Figure 6:
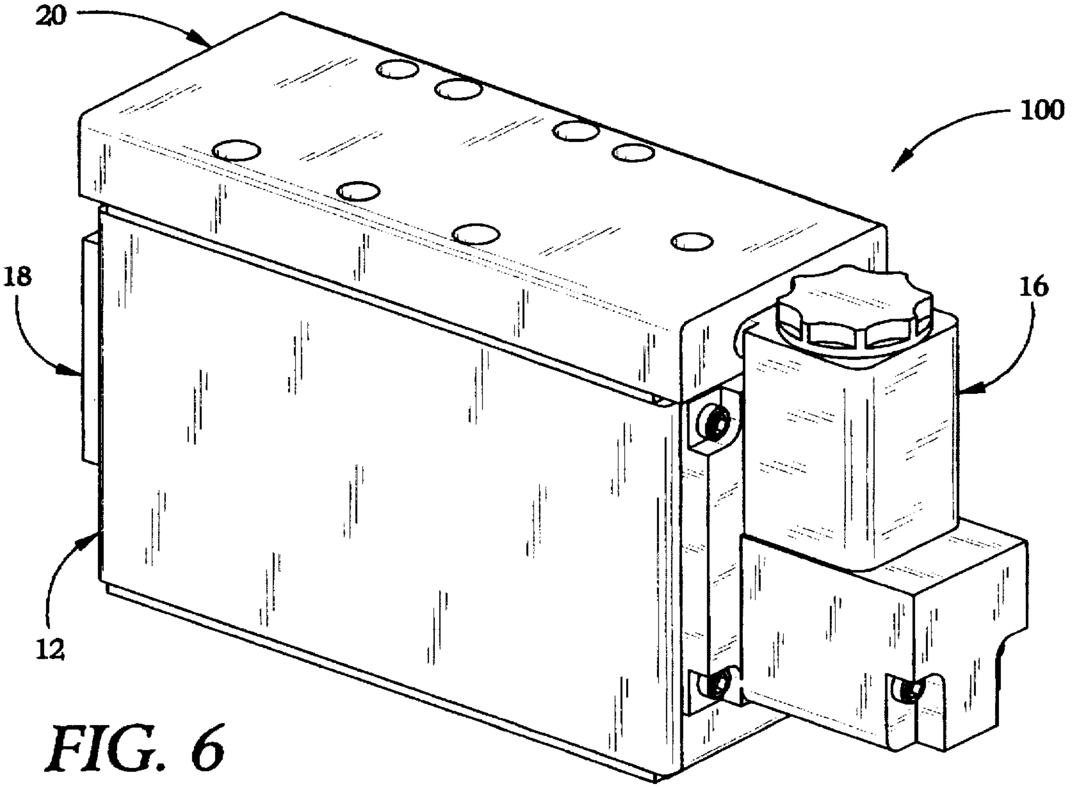
FIG. 6 is an isometric view of the assembled pneumatic control valve of FIG. 4.

FIGS. 4–6 disclose a second embodiment pneumatic control valve 100 that is identical to first embodiment control valve 10 except for second embodiment unitary gasket 110. Elongate gasket 110 is flexible and unitary and is adapted to be wrapped around housing 12. The gasket includes first sealing portion 140, second sealing portion 142, third sealing portion 144, and fourth sealing portion 145. The second sealing portion 142 joins portions 140 and 144, and the third sealing portion 144 joins portions 142 and 145. The unwrapped gasket has a substantially rectangular perimeter. When the gasket is wrapped around the housing 12, the first sealing portion is located on housing surface 24, the second sealing portion is located on housing surface 26, the third sealing portion is located on housing surface 30 and the sealing portion is located on housing surface 28.

The second and fourth sealing portions 142 and 145 include alignment cutouts 148 and 146 respectively that are adapted to engage alignment guide members 32 and 34 on surfaces 26 and 28 in the manner previously described.

The pneumatic control valve 100 is assembled in the manner previously described except that the initial step in the assembly process is to wrap gasket 110 completely around housing 12. Like the assembly method described in the first preferred embodiment, the a sealing portion 140, 142, 144 or 145 utilized to properly orient and align the gasket. The portion selected is located on and aligned with the associated housing surface. Then the rest of the gasket is wrapped around the housing edges, 29, 31, 33, and 35 until each of the sealing portions are located on the respective housing surfaces. The cover plate, end plate and fluid control means are then connected to the housing using fasteners 50.

The assembled valve is then flow connected to the object of interest with the third sealing portion forming the required seal between the valve 110 and the object of interest.

While I have illustrated and described a preferred embodiment of our invention, it is understood that this is capable of modification, and I therefore do not wish to be limited to the precise details set forth, but desire to avail myself of such changes and alterations as fall within the purview of the following claims.

Having described the invention, what is claimed is:

1. A pneumatic control valve comprising a valve housing having a first end and a second end, a first housing surface being located at the first end, a second housing surface being located at the second end, and a third housing surface joining the first and second housing surfaces;

a unitary sealing member including a first sealing portion, a second sealing portion, and a third sealing portion, the unitary sealing member is adapted to be wrapped around the housing so that the first sealing portion, the second sealing portion, and the third sealing portion are located on the first housing portion, the second housing portion and the third housing portion, respectively;

wherein the first and second housing surfaces include alignment members and the first and second sealing portions have alignment cutouts formed therein, said alignment cutouts adapted to receive the alignment members when the respective sealing portion is located on the respective housing surface.

2. The pneumatic control valve as claimed in claim 1 wherein the unitary sealing member has a first sealing portion which joins the second and third sealing portions wherein the unwrapped sealing member is elongate and has a substantially rectangular perimeter.

3. The pneumatic control valve as claimed in claim 1 wherein the housing includes a fourth housing surface and the unitary sealing member includes a fourth sealing portion made integral with the third sealing portion, the fourth sealing portion adapted to be located on the fourth housing surface.

4. The pneumatic control valve as claimed in claims 3, wherein the unwrapped sealing member being elongate and comprising a substantially rectangular perimeter.

5. The pneumatic control valve as claimed in claim 1 wherein the first and second housing surfaces lie in parallel planes and the third housing surface lies in a plane perpendicular to the planes of the first and second housing surfaces.

6. The pneumatic control valve as claimed in claim 1 wherein the housing includes a fourth housing surface which joins the first and second housing surfaces and lies in a plane that is parallel to the plane of the third housing surface.

7. A pneumatic valve comprising:

a) a valve housing having a first housing surface, and a second housing surface;

b) a unitary gasket adapted to be wrapped around the valve housing, the unitary gasket having a first sealing portion, and a second sealing portion that are located respectively on the first, and second housing surfaces when the unitary gasket is wrapped around the valve housing;

c) positioning guides disposed on the first and second housing surfaces;

d) alignment grooves disposed on the first and second sealing portions, the alignment grooves adapted to receive the respective positioning guides;

e) fluid flow control means overlaying the first sealing portion; and f) an end plate overlaying the second sealing portion.

8. The pneumatic valve as claimed in claim 7 wherein the valve housing includes: a third housing surface, the unitary gasket includes a third sealing portion located on the third housing surface; and a cover plate adapted to overlay the third sealing portion.

9. The pneumatic control valve as claimed in claim 7 wherein the valve housing includes a third housing surface and the unitary gasket includes a third sealing portion adapted to be located on the third housing surface.

* * * * *